UNITED STATES PATENT OFFICE.

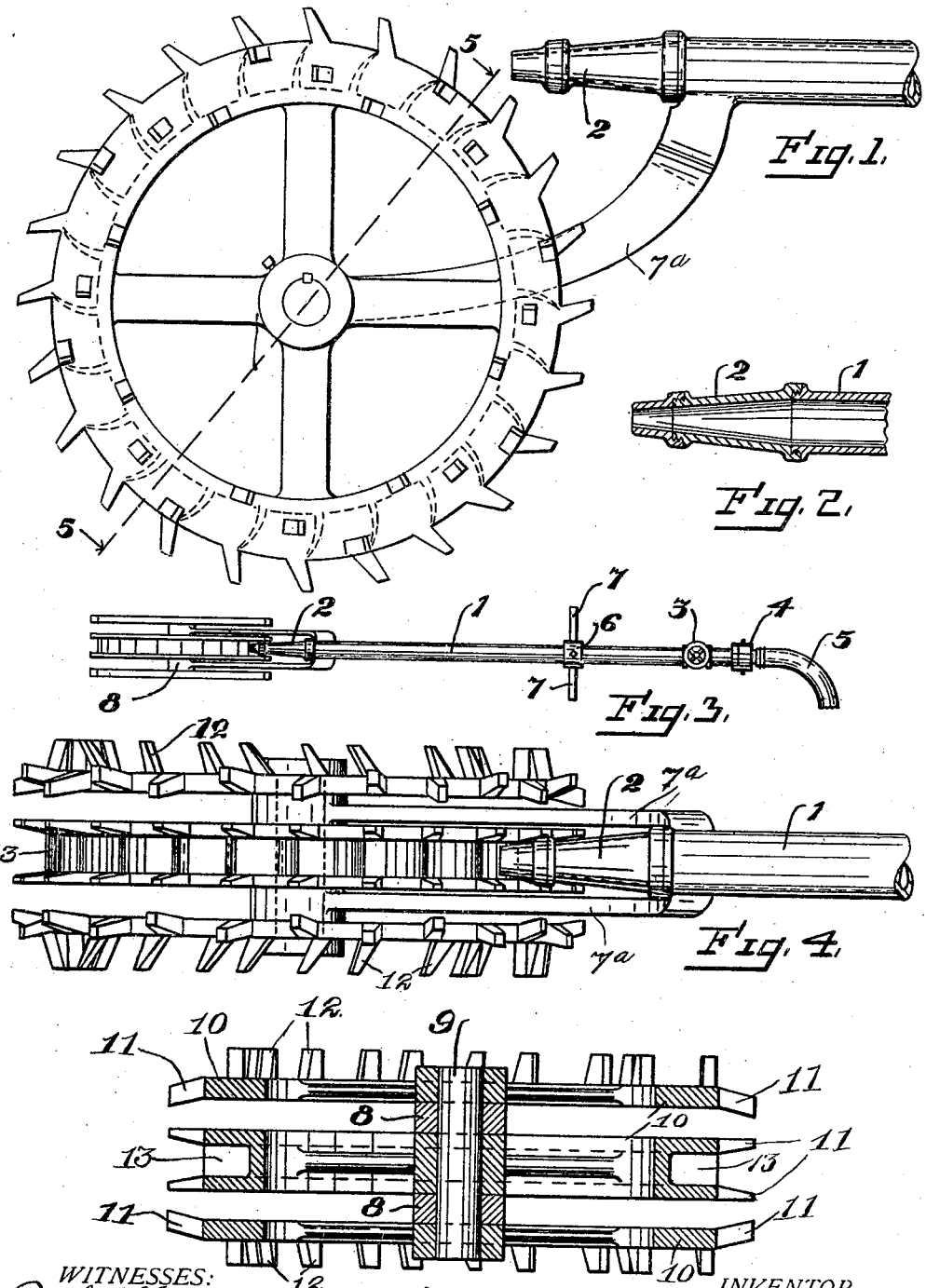

SAMUEL H. RICHARDSON, OF SEATTLE, WASHINGTON.

APPARATUS FOR CUTTING AND SLUICING.

No. 810,810.　　　　Specification of Letters Patent.　　　　Patented Jan. 23, 1906.

Application filed July 22, 1904. Serial No. 217,736.

*To all whom it may concern:*

Be it known that I, SAMUEL H. RICHARDSON, a citizen of the United States of America, and a resident of the city of Seattle, in the county of King and State of Washington, have invented certain new and useful Improvements in Apparatus for Cutting and Sluicing, of which the following is a specification.

My invention relates to improvements in apparatus for cutting and sluicing; and the primary object thereof is to provide means whereby the construction of apparatus of this type is greatly simplified, and, further, if desired, the combined operation of cutting and sluicing is simultaneously accomplished and the cutters operated by the element employed for sluicing the material disintegrated thereby.

Further objects and advantages will be set forth in the following description, and those features of construction which I claim as new defined in the appended claims.

In the accompanying drawings, forming a part of this specification, and wherein like numerals of reference indicate like parts throughout the several views, Figure 1 is a view in side elevation of the invention, a portion of the handle thereof being broken away. Fig. 2 is a longitudinal section of the nozzle and a portion of the handle to which it is attached. Fig. 3 is a top plan view of the invention, the same being taken on a reduced scale and illustrating more fully the construction of the handle and its connection with a suitable source of supply. Fig. 4 is a view in top plan of Fig. 1; and Fig. 5 is a diametrical section of the cutter, taken on line 5 5 of Fig. 1.

In carrying out the invention a stem or handle 1 is provided, the same being preferably of tubular form and provided at its inner end with a nozzle 2, which is removably secured and, further, is constructed with a removable tip, whereby other tips can be substituted to alter the size of the stream of the fluid employed for sluicing. At a predetermined point in the handle 1 a valve 3 is mounted for controlling the supply of fluid which is received through a flexible conduit or hose 5, the latter being removably coupled to the outer end of the handle by a means as 4. Adjustably mounted on the handle is a handhold comprising a sleeve or collar 6 and laterally-projecting bars 7. This sleeve is slidable on the handle and is held in its adjusted position by a set-screw. Any desired means, however, can be employed for accomplishing this result.

Formed integral with the forward end of the handle and projecting in advance thereof are arms 7ª, the same being spaced apart and having their free or lower ends formed with bearings 8, in which is journaled a shaft 9. On this shaft I key rotary cutters 10, there being three employed, the intermediate cutter being disposed between the arms 7ª and the outer cutters on the ends of the shaft 9 which project through the bearings 8.

The rotary cutters are of wheel form and are provided with peripheral teeth 11, those of the outer cutter being staggered, and to insure a more thorough loosening of the earth the sides of the outer cutters are also provided with teeth 12, and at points between the teeth of the intermediate cutter impact surfaces or pockets 13 are provided.

By reference to Figs. 1 and 3 of the drawings it will be observed that the nozzle 2 extends into proximity to the upper portion of the intermediate cutter and in alinement with pockets thereof. Thus when the stream of fluid is emitted from the nozzle it will strike the uppermost pockets and start the cutters in their movement, and as all of the pockets will be successively engaged by the jet the rotation of the cutters will be uninterrupted, and the water flowing from the pockets will sluice away the material as it is excavated. The cutters are shown of open form, and this construction is simple and capable of carrying out the functions assigned thereto; but the same can be readily altered, and, further, the relative positions of the cutter-teeth can be varied without departing from the spirit of the invention.

The invention is especially adapted for use in excavating in banks of clay or bodies of hard-pan or mixtures of sand and clay where hydraulic jets alone fail to disintegrate. It is further useful in frozen ground. In the first instances water is employed as a combined motive force and sluicing agent; but in the latter instance steam or hot water is employed. It will be further noted that compressed air can be employed for driving the cutter and the earth excavated subsequently in any desired manner.

In operation the handle 1 is fulcrumed on a boulder, sawhorse, or the like arranged adjacent the material to be operated upon and the lateral bars 7 of the handhold grasped, usually by two men, one on each side of the handle. The valve 3 is then opened, whereupon the fluid will act upon the cutters, as heretofore stated.

The apparatus can be readily advanced on its fulcrum or swing laterally, this being permitted by reason of its flexible connection 5 with the source of supply.

Having thus fully described the invention, I claim as new and desire to secure by Letters Patent—

1. In an apparatus of the nature indicated, a cutter provided with peripheral teeth and pockets between said teeth, in combination with means for directing a fluid into said pockets, whereby the cutter is operated.

2. In an apparatus of the nature indicated, a cutter provided with impact-surfaces, and a means for discharging a fluid against said impact-surfaces for operating the cutter.

3. In a combined cutting and sluicing apparatus, a cutter, means for directing a fluid to said cutter for operating the same, and means whereby the fluid after operating the cutter will be discharged therefrom to sluice the material excavated.

4. In a combined cutting and sluicing apparatus, a rotary cutter, means for conveying a fluid to a point adjacent the cutter, and means acted upon by the fluid thus conveyed for operating said cutter.

5. In a combined cutting and sluicing apparatus, a cutter, means for directing a fluid to a point adjacent the cutter for sluicing, and means acted upon by the water for operating said cutter.

6. In a combined cutting and sluicing apparatus, a plurality of cutters, a fluid-supply means, and means acted upon by the water from said means for operating said cutters.

7. In an apparatus of the nature indicated, a plurality of cutters, one of said cutters being provided with impact-surfaces, and a nozzle arranged in juxtaposition to said impact-surfaces.

8. In an apparatus of the nature indicated, a plurality of spaced-apart cutters arranged side by side and provided with teeth, the teeth of certain of said cutters being disposed out of alinement with each other, and means for operating said cutters.

9. In an apparatus of the nature indicated, a cutter provided with impact-surfaces, a second cutter movable with the first-named cutter, and means for directing an operating means for the cutters against said impact-surfaces.

10. In an apparatus of the nature indicated, a hollow handle, a pair of arms secured thereto, a cutter mounted for rotation between said arms and being provided with pockets, and a nozzle secured to the inner end of said handle and being in alinement with said pockets.

11. In an apparatus of the nature indicated, a handle, a rotary cutter member supported from said handle, cutters disposed on opposite sides of the said cutter member, and means for operating all of said cutters simultaneously, the axis of rotation of said cutters being at substantially right angles to said handle.

12. In an apparatus of the nature indicated, a handle, a pair of arms secured thereto, a shaft journaled in said arms and projecting on opposite sides thereof, cutters mounted on said shaft, one of said cutters being disposed between said arms, and means whereby said cutters are operated simultaneously.

13. In an apparatus of the nature indicated, a hollow handle, a nozzle secured thereto at one end, and a rotary cutter disposed in advance of the nozzle and being supported from said handle.

14. In an apparatus of the nature indicated, a hollow handle, a nozzle secured thereto at one end, a rotary cutter disposed in advance of the nozzle, and a valve in said handle.

15. In an apparatus of the nature indicated, a hollow handle, a valve therein, a rotary cutter in advance of the handle and being supported thereby, and means whereby the cutter is operated by a fluid passing through the handle.

16. In an apparatus of the nature indicated, a hollow handle, a flexible tube in communication with one end thereof, a nozzle on the other end of said handle, a valve in said handle, and a cutter disposed in juxtaposition to the nozzle and being formed with impact-surfaces movable past said nozzle.

17. In an apparatus of the nature indicated, a hollow handle, a flexible tube in communication with one end thereof, a nozzle on the other end of said handle, a rotary cutter supported from said handle and lying in advance of said nozzle, said cutter being formed with impact-surfaces disposed in alinement with said nozzle.

18. In an apparatus of the nature indicated, a hollow handle, a flexible tube connected to one end thereof, a pair of arms secured to the other end thereof, a shaft journaled in said arms, a plurality of cutters fixed to said shaft, one of said cutters being formed with impact-surfaces, and means for directing fluid from said handle against said impact-surfaces so as to rotate the cutters.

19. In an apparatus of the nature indicated, a hollow handle, a valve therein, a flexible tube connected to one end of the handle, a nozzle secured to the other end of the handle, a pair of arms formed integral with the handle, a shaft journaled in the arms and projecting on opposite sides thereof, a cutter fixed on each end of the shaft, a cutter fixed on the shaft at a point between the arms, said last-named cutter being formed with impact-surfaces disposed in alinement with the nozzle.

20. In an apparatus of the nature indicated, a cutter having peripheral staggered teeth, alternately projecting on opposite sides thereof, and teeth on one of its sides, said last-named teeth also being staggered relatively to each other.

Signed at Seattle, Washington, this 14th day of July, 1904.

SAMUEL H. RICHARDSON.

Witnesses:
W. PARRY SMITH,
L. H. PONTIUS.